Aug. 22, 1933. J. C. STOKES 1,923,283

SLIP

Filed Sept. 26, 1932

Inventor
JOHN C. STOKES.
Jesse R. Stone
Lester B. Clark
Attorneys

Patented Aug. 22, 1933

1,923,283

UNITED STATES PATENT OFFICE 1,923,283

SLIP

John C. Stokes, Houston, Tex.

Application September 26, 1932
Serial No. 634,828

17 Claims. (Cl. 24—263)

The invention relates to an improvement in a slip construction of the type used in supporting pipes vertically in and about well drilling operations. It is one of the objects of the invention to provide a slip construction which may be readily passed into the slip bowl or seat and which will thereafter assume the load of pipe and positively remain in position.

Another object of the invention is to provide a slip with projecting surfaces which will readily slide upon the slip bowl or seat, but which may be compressed to permit the slip to grip the pipe and the seat in absorbing the load.

Another object of the invention is to provide a slip made up of a combination of metal and resilient material which will permit the greatest flexure of the parts while still maintaining the general configuration.

Another object of the invention is to provide a slip construction which has a non-circular normal outside periphery but which is adapted to be deformed from its normal configuration to a configuration which will fit the slip bowl when a load is applied to the slip.

Another object of the invention is to provide a slip construction composed of alternate metal and rubber sections which are bonded together to form an unitary member.

Still another object of the invention is to provide a slip having a rubber body portion with metal segments vulcanized therein but which are normally disposed within the confines of the outside surfaces of the rubber body and which are adapted to move flush with the body surface when the load is applied to the slip.

Another object of the invention is to provide a reenforcing member for the rubber to maintain the same in contact with the metal segment.

It is also an object of the invention to connect the rubber and metal sections of the slip together by a flexible cable passing therethrough.

Other and further objects of the invention will be readily apparent when the following description is considered in connection with the accompanying drawing wherein.

Figure 1:
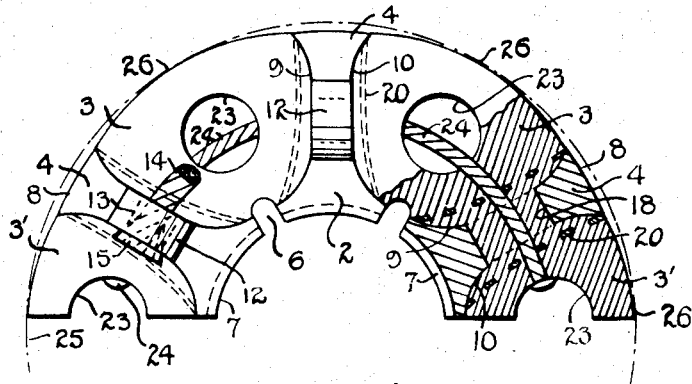
Fig. 1 shows a top plan view of a slip member with standing portions broken away and shown in section to illustrate the construction.

The slip is indicated in Fig. 1 generally by the reference character 2 and this slip is composed of a body, the major portion of which is made up of the resilient segments 3. In the slip shown in Fig. 1 the member is constructed as a half-circle so that two such slip members would be necessary to support the pipe. In this view there has been shown two complete rubber segments 3 and two partial segments 3' at each edge of the member. This construction is preferable, but it is to be understood that if the slip is to be made so that it requires three or four members to complete the circle, any desired number of rubber segments may be provided.

Disposed in the rubber body portion and between the segments 3 are the metal jaws or sections 4. In Fig. 1 there are three of these jaws or sections illustrated. The metal and the rubber sections are alternately disposed with respect to each other and the rubber segments 3 are of such size that the metal jaws are spaced apart a short distance as indicated at 6. Each of the metal jaws include an inside pipe engaging or clamping face 7 and an outer seat engaging face 8. As seen in the drawing, the face 7 is a greater arc of a circle than is the face 8. In this manner, the pressure on the pipe is distributed so that cutting in the pipe will be avoided. The wide face 7 also avoids tilting of the jaw when a torque is applied to the pipe. The faces 7 and 8 are joined by the oppositely disposed concave side surfaces 9 and 10. The top of each of the metal segments 4 is provided with a ring or loop 12 which is provided with an opening 13 to receive the cable 14 used as a handle. This cable may be anchored in the end loops by having its end enlarged as at 15 to prevent it from pulling through the opening.

Disposed between two adjacent metal sections 4 are the segments or sections of resilient material 3.

Fig. 1 best shows the arrangement of the metal and rubber sections wherein the rubber is shown as having been vulcanized to the surfaces 9 and 10 of the metal jaws. The metal jaws may be provided with a plurality of openings 18 in order to permit the adjacent bodies of rubber to be connected together. While it is intended that any suitable resilient material may be used, it is contemplated that rubber will be the most satisfactory and the rubber may be molded or vulcanized in position. As seen in Fig. 1, the rubber has been molded in position and vulcanized to the surfaces 9 and 10 and passing through the openings 18.

Figure 3:
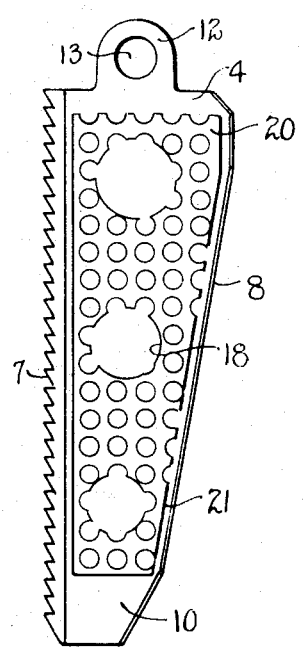
Fig. 3 is a side elevation of one of the metal segments or jaws showing the arrangement of the reenforcing member before the rubber is applied thereto.

If desired, a suitable reenforcing member such as 20 may be provided. Fig. 3 shows the member 20 as taking the form of a perforated plate. This plate is substantially flat and has been welded to the concaved surface 10 by being welded along its edges at 21 to the metal jaws. As seen in Fig. 1 this plate 20 is spaced somewhat from the surface 10 so that when the rubber is molded or vulcanized in position it will pass through the plate and fill all of the area and be securely bonded to the metal jaws 4. The rubber sections 3 are provided with a vertical passage 23 in order to increase the resiliency thereof and permit compression of the section when the load is to be absorbed by the slip. A connecting cable 24 has been shown as passing circumferentially through the rubber and metal sections with a view of preventing stressing of the rubber beyond its elastic limit and also preventing destruction of the bond between the rubber and the metal.

Figure 2:
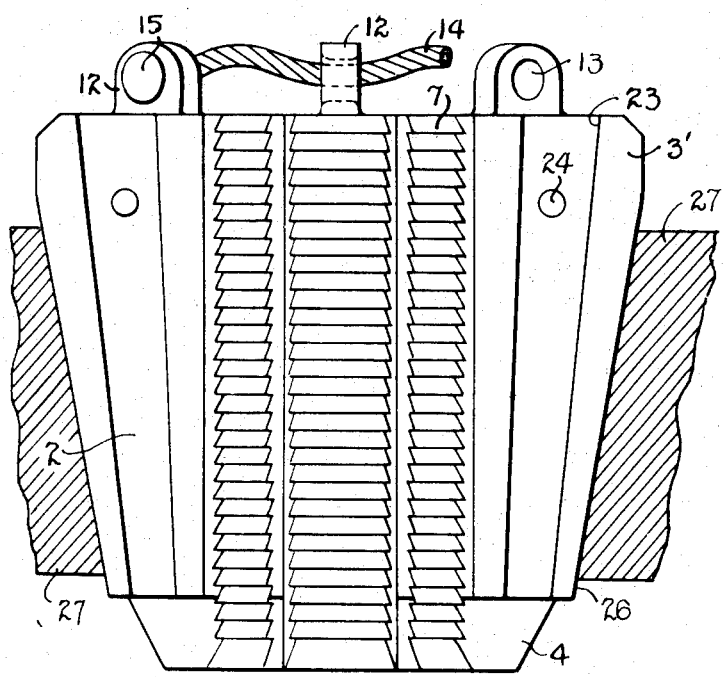
Fig. 2 shows a side elevation looking at the inside face of the slip member and showing the same disposed in the slip bowl.

Particular attention is directed to Fig. 1 wherein a circular line 25 is shown. This line when drawn about the center upon which the slip member is constructed, will be seen to touch only the center outer surface 26 of the rubber sections 3 and 3'. The remaining outer surface of the entire slip lies within this circular line 25 so that the slip as a whole has a non-circular configuration. This construction is provided for the specific purpose of permitting the slip to pass readily into the slip bowl 27, a portion of which is shown in section in connection with Fig. 2. It will thus be apparent that when the slip is first passed into the seat, that it must slide downwardly into the bowl and the rubber surfaces at 26 are the only portion to contact with the seat. As is usual in and about well drilling operations, the seat is either wet or muddy, and very often is covered with oil. The rubber slides readily upon such a surface and therefore the slip will easily pass into practically its lowermost position so that it will quickly grip the pipe.

As soon as the serrated face 7 engages the pipe the slip will be carried downwardly slightly with the pipe. This downward movement occurs while the slip is assuming or absorbing the load of the pipe. When pressure is applied to the faces 7 it will, of course, be transmitted from the metal to the rubber members through the faces 9 and 10 and transmitted to the slip bowl by the rubber through the face 26.

As the load increases, however, the inherent resiliency of the rubber comes into play and the face 26 is slightly compressed so that it moves inwardly and allows the outer faces 8 of the metal jaw members to come into engagement with the slip bowl 27. In other words, the rubber is compressed as a whole and the metal members are caused to project from their normal position and caused to engage the seat and thereafter carry the load of the pipe. In this manner, the slip will be firmly positioned. There will be no possibility of sliding of the pipe in the slip member because the rubber sections are constantly forcing the metal jaw members against the pipe. The arrangement and construction of the alternate rubber and metal segments causes the stresses to be uniformly transmitted throughout the slip and causes it to take the configuration wherein the greatest load will be absorbed by uniformly distributing the weight.

When the slip is to be released from engagement, it is only necessary to raise the pipe slightly as is customary with other slips, and when this occurs the rubber portions will move the metal jaws inwardly so that they will readily release the slip bowl.

One of the greatest difficulties in connection with all metal slips that are now in general use, is that the metal jaws bind between the pipe and the metal seat and do not release when the load is removed. With the present slip, however, the provision of the rubber segments permit sufficient flexibility between the jaw members and the fact that the jaw members do not contact with each other allows a limited amount of movement which readily releases the jaws because of the pressure of the rubber which has been confined when the load was absorbed.

While one form of the invention has been shown and described, it is to be understood that the arrangement of the jaws and resilient sections may be arranged as desired, and that they may assume different configurations than those illustrated in the drawing because the invention contemplates broadly the mounting of metal support members of a slip in a resilient body.

Having described my invention, what I claim is:

1. A slip for supporting pipe including a plurality of jaws arranged in spaced apart relation, flexible means connecting said jaws for limited relative movement, and resilient material disposed between the adjacent sides of said jaws to space said jaws.

2. A slip member including segments adapted to be positioned in a tapered seat to support pipe, said slip being composed of a plurality of alternately arranged radially disposed jaws and rubber spacers, whereby said jaws may have limited relative movement.

3. A slip including in combination vertically arranged metallic jaw members and resilient spacers therebetween, whereby the jaws may have relative movement in gripping and releasing the load.

4. A slip made up of a plurality of jaws, resilient spacers projecting radially beyond said jaws and adapted to yield when the slip is loaded whereby said jaws will absorb the load.

5. A jaw for slips including a gripping face, a seat engaging face, said faces being joined by oppositely disposed concaved surfaces said gripping face having a greater width than said seating face whereby to increase the contact area with the pipe.

6. A slip including a plurality of connected alternately disposed metal and rubber segments, said rubber segments projecting slightly beyond the periphery of the metal segments and adapted to be compressed when the slip is loaded.

7. A slip having metal jaws, rubber members carried by said jaws and extending to first engage the seat when said slip is moved into the slip seat, said rubber members being so disposed that they will yield when the slip absorbs the load and the metal jaws will then engage the seat.

8. A slip segment composed of connected metal and flexible sections, said flexible sections projecting beyond the periphery of said metal sections and adapted to be compressed when the slip is loaded.

9. In combination with a slip bowl, a slip seat, a slip made up of segments having metal sections and resilient sections, said resilient sections normally projecting outwardly beyond said metal sections and adapted to first contact said slip seat, but adapted to be compressed by the load on the slip so that the metal sections will then engage said seat.

10. A slip comprising vertically arranged alternate metal and rubber sections with the rubber sections vulcanized to the metal sections.

11. A slip comprising alternate metal and rubber sections with the rubber sections vulcanized to the metal sections, and reenforcing members fixed to said metal sections and about which said rubber sections are vulcanized.

12. A slip comprising alternate metal and rubber sections with the rubber sections vulcanized to the metal sections, reenforcing members fixed to said metal sections and about which said rubber sections are vulcanized, and a cable member passing circumferentially through said alternate sections.

13. A slip comprising alternate metal and rubber sections with the rubber sections vulcanized to the metal sections, reenforcing members fixed to said metal sections and about which said rubber sections are vulcanized, a cable member passing circumferentially through said alternate sections, and a flexible cable connecting the tops of the metal sections as a handle.

14. A slip including metal jaws, concaved sides on said jaws, and rubber molded in between said jaws and against said sides to resiliently connect said jaws.

15. A slip including metal jaws, concaved sides on said jaws, rubber molded in between said jaws and against said sides to resiliently space said jaws, and openings through said jaws so that the rubber passes therethrough.

16. A slip for supporting pipe including a rubber body, metal load supporting jaws mounted on said body and adapted to project radially from the body to absorb the load when said body is compressed.

17. A slip segment made up of metal and resilient sections, means connecting said sections to form the segment whereby the resiliency of the resilient sections allows the metal sections to absorb the load.

JOHN C. STOKES.